US010701418B2

(12) United States Patent
Johns

(10) Patent No.: US 10,701,418 B2
(45) Date of Patent: *Jun. 30, 2020

(54) SYSTEMS AND METHODS FOR RESOLVING MANIFEST FILE DISCONTINUITIES

(71) Applicant: Level 3 Communications, LLC, Broomfield, CO (US)

(72) Inventor: Kevin C. Johns, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/896,877

(22) Filed: Feb. 14, 2018

(65) Prior Publication Data
US 2018/0234714 A1  Aug. 16, 2018

Related U.S. Application Data

(60) Provisional application No. 62/534,315, filed on Jul. 19, 2017, provisional application No. 62/458,968, filed on Feb. 14, 2017.

(51) Int. Cl.
*G06F 11/00* (2006.01)
*H04N 21/24* (2011.01)
(Continued)

(52) U.S. Cl.
CPC ....... *H04N 21/2404* (2013.01); *G06F 16/172* (2019.01); *G06F 16/41* (2019.01);
(Continued)

(58) Field of Classification Search
CPC ............. G06F 11/0709; G06F 11/0727; G06F 11/073; G06F 11/0745; H04N 21/2404;
(Continued)

(56) References Cited

U.S. PATENT DOCUMENTS 9,509,784 B2 * 11/2016 Johns ...................... H04L 67/18
9,594,761 B2 *  3/2017 Jakobowski ............ H04L 67/02
(Continued)

OTHER PUBLICATIONS

International Search Report and Written Opinion of the International Searching Authority, dated May 14, 2018, Int'l Appl. No. PCT/US18/018208, Int'l Filing Date Feb. 14, 2018; 8 pgs.
(Continued)

*Primary Examiner* — Elmira Mehrmanesh

(57) ABSTRACT

A system and corresponding method facilitate resolution of discontinuities in manifest files used in the distribution of stored content. Resolution of discontinuities includes identifying each of a discontinuity in a first manifest file and a corresponding entry in a second manifest file for the same or substantially similar content segment stored at a different location. A combined manifest file is then generated by inserting the entry of the second manifest file or otherwise inserting the location information of the second manifest file entry into the first manifest file. The systems and methods herein may be implemented at various locations within a system for providing content to a client device and may be implemented at various times in the process of generating or distributing content.

19 Claims, 7 Drawing Sheets

(51) Int. Cl.
  *H04N 21/278* (2011.01)
  *H04L 29/08* (2006.01)
  *H04N 21/266* (2011.01)
  *G06F 16/172* (2019.01)
  *G06F 16/41* (2019.01)
  *H04N 21/845* (2011.01)

(52) U.S. Cl.
  CPC ....... *H04L 67/1097* (2013.01); *H04N 21/266* (2013.01); *H04N 21/278* (2013.01); *H04N 21/8456* (2013.01)

(58) Field of Classification Search
  CPC . H04N 21/266; H04N 21/278; H04N 21/8456
  See application file for complete search history.

(56) References Cited

U.S. PATENT DOCUMENTS

| | | | | |
|---|---|---|---|---|
| 9,596,170 | B2* | 3/2017 | Johns | H04L 45/22 |
| 9,634,918 | B2* | 4/2017 | Lipstone | H04L 41/509 |
| 9,641,402 | B2* | 5/2017 | Newton | H04L 41/0893 |
| 9,749,191 | B2* | 8/2017 | Varney | H04L 41/0893 |
| 10,148,716 | B1* | 12/2018 | Joseph | G06F 16/16 |
| 2011/0082924 | A1* | 4/2011 | Gopalakrishnan | H04L 65/4084 709/223 |
| 2012/0233228 | A1 | 9/2012 | Barton | |
| 2014/0173677 | A1 | 6/2014 | Lohmar et al. | |
| 2014/0280906 | A1 | 9/2014 | Johns et al. | |
| 2014/0379871 | A1 | 12/2014 | van Brandenburg et al. | |
| 2015/0334153 | A1* | 11/2015 | Koster | H04L 65/4069 709/219 |
| 2016/0066009 | A1* | 3/2016 | Rothschild | H04N 21/236 725/5 |
| 2016/0127440 | A1* | 5/2016 | Gordon | H04N 21/23439 709/219 |
| 2016/0337715 | A1 | 11/2016 | Kervadec et al. | |

OTHER PUBLICATIONS

International Preliminary Report on Patentability, dated Aug. 20, 2019, Int'l Appl. No. PCTUS18018208; Int'l Filing Date Feb. 14, 2018; 7 pgs.

* cited by examiner

SYSTEMS AND METHODS FOR RESOLVING MANIFEST FILE DISCONTINUITIES

CROSS-REFERENCE TO RELATED APPLICATIONS

This application is related to and claims priority under 35 U.S.C. § 119(e) from U.S. Patent Application No. 62/458,968, filed Feb. 14, 2017, titled "MANIFEST PROCESSING IN A CONTENT DELIVERY NETWORK (CDN)", and from U.S. Patent Application No. 62/534,315, filed Jul. 19, 2017, titled "SYSTEMS AND METHODS FOR RESOLVING MANIFEST FILE DISCONTINUITIES," the entire contents of which are both incorporated herein by reference for all purposes.

TECHNICAL FIELD

Aspects of the present disclosure involve resolving errors in manifest files used in content distribution, and more particularly involve correcting errors in manifest files by combining multiple manifest files for retrieving content from disparate locations of a network.

BACKGROUND

Content distribution networks (CDNs) generally function by retrieving and distributing electronic content from content providers and, more specifically, from origin servers hosting the content to be distributed. Once retrieved, the content can be cached at various locations within the CDN, generally referred to as edge servers, to facilitate efficient distribution of the content.

Content available over a CDN is produced by content providers, which may include, without limitation, television networks, movie studios, video-sharing platforms, and countless other types of content providers. Generally, the content provider produces the content (which may include encoding the content) and makes the content available for distribution over the CDN. Content may be divided into discrete segments, commonly referred to as "transport segments" or "media segments" and, if so, producing the content may further include generating a manifest file that sequentially lists the segments of a given piece of content along with their respective network locations.

When a device is used to access content from a CDN, a request is transmitted to a domain name server (DNS) that recognizes the content is to be distributed over the CDN and redirects the request to the CDN. The CDN then identifies a CDN edge server from which the content should be served to the device. In certain instances, the edge server is selected based on geographic proximity to the DNS resolver from which the request was received, but other considerations, such as load balancing and the status of CDN equipment among others, may be taken into account when selecting an edge server from which the content is to be provided to the device. If the content is not currently located at an edge server, the CDN may copy the content to the edge server from another cache of the CDN or from the origin server. The edge server then provides the requested content to the device.

In the case of segmented content, the CDN responds to a request for the content by providing the corresponding manifest file to the device. The device, through an application such as a media player running on the device, then makes sequential requests for the segments of the content based on the order and location of data stored within the manifest file. Similar to the original request, the individual segment requests are each forwarded to the CDN and handled by serving the requested segment from the appropriate edge server. In the context of live-streamed content, a content provider may continuously generate new segments and update the corresponding manifest file to include entries for the new segments. As a result, the device must periodically request an updated version of the manifest file in order to request and receive the new segments.

It is with these observations in mind, among others, that aspects of the present disclosure were conceived.

SUMMARY

In one implementation of the present disclosure, a method of resolving errors in a manifest file is provided. The method includes identifying a first discontinuity in a first manifest file for retrieving content segments of stored content, the first discontinuity corresponding to an entry of the first manifest file and a first content segment. The method further includes identifying an entry of a second manifest file, the entry of the second manifest file including location information for retrieving a second content segment. A combined manifest file is then generated by replacing the entry of the first manifest file, at least in part, with the location information of the entry of the second manifest file such that the first discontinuity is resolved using the location information for retrieving the second content segment.

In another implementation of the present disclosure, a system for resolving errors in a manifest file is provided. The system includes a computing device including a processor and one or more non-transitory tangible computer-readable storage media storing computer-executable instructions. When executed by the processor, the instructions cause the computing device to identify a first discontinuity in a first manifest file for retrieving content segments of stored content, the first discontinuity corresponding to an entry of the first manifest file and a first content segment. The instructions further cause the computing device to identify an entry of a second manifest file, the manifest file entry of the second manifest file including location information for retrieving a second content segment. The instructions then cause the computing device to generate a combined manifest file by replacing the entry of the first manifest file, at least in part, with the location information of the entry of the second manifest file such that the first discontinuity is resolved using the location information for retrieving the second content segment.

In yet another implementation of the present disclosure, a non-transitory computer-readable medium is provided. The medium includes instructions that, when executed by one or more processors of a computing device, cause the computing device to identify a first discontinuity in a first manifest file for retrieving content segments of stored content, the first discontinuity corresponding to an entry of the first manifest file and a first content segment. The instructions further cause the computing device to identify a manifest file entry of a second manifest file, the manifest file entry of the second manifest file including location information for retrieving a second content segment. The instructions then cause the computing device to generate a combined manifest file by replacing the entry of the first manifest file, at least in part, with the location information of the entry of the second manifest file such that the first discontinuity is resolved using the location information for retrieving the second content segment.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Figure 1:
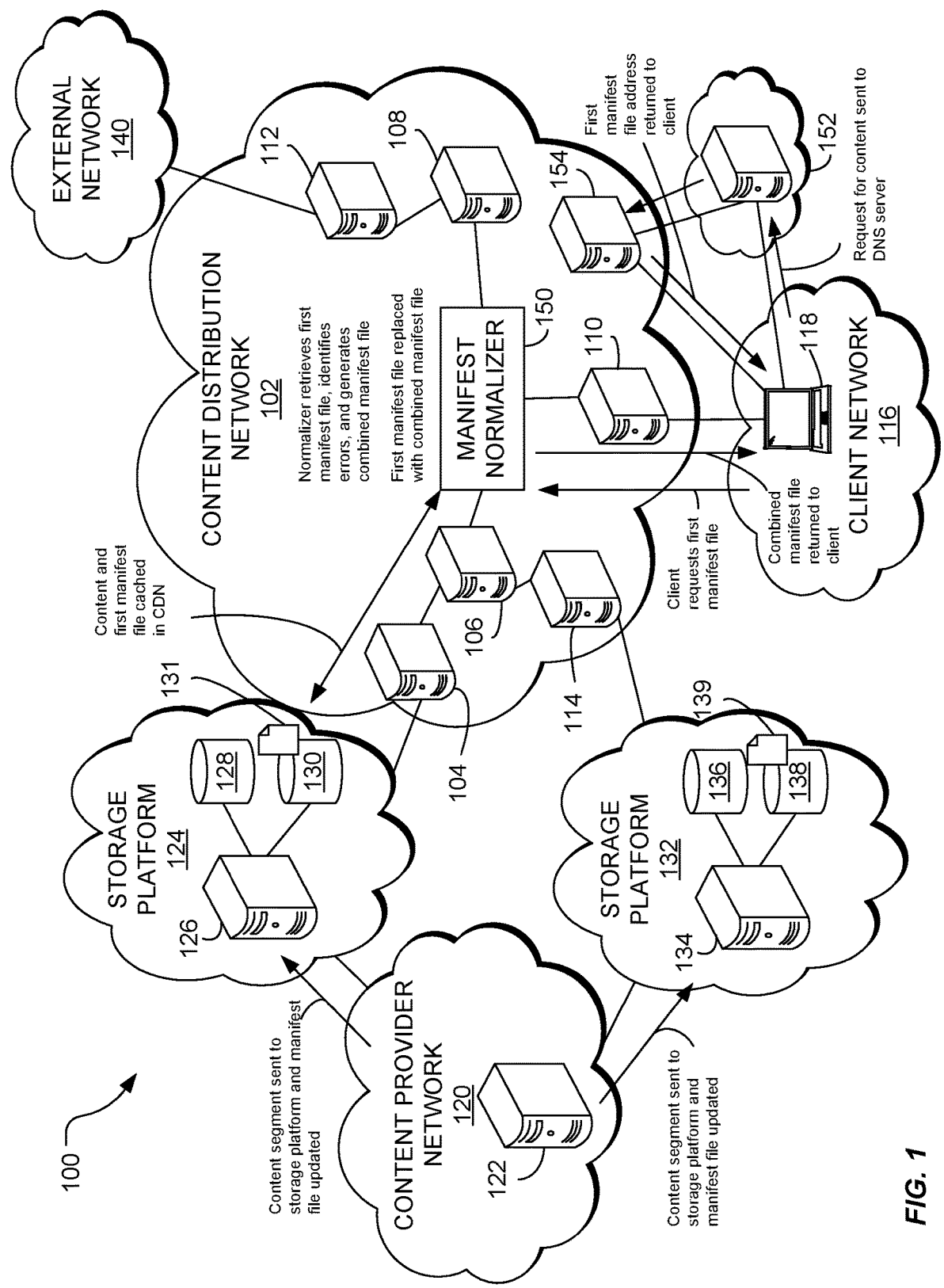
FIG. 1 is a schematic illustration of an example network environment including functionality to resolve errors in manifest files.

This patent application involves, among other things, systems and methods for resolving errors in manifest files used to obtain stored content, such as content made available over a content distribution network (CDN). To do so, the systems and methods disclosed herein combine a primary manifest file found to include discontinuities or other errors corresponding to one or more content segments with one or more secondary manifest files that include network location information for the problematic content segments.

During content creation, a computing device associated with a content provider segments the content into multiple transport or media segments, each transport segment corresponding to a discrete portion of the content. For example, a transport segment may correspond to a five or ten-second portion of audio or video. The content provider computing device further generates a manifest file that includes sequential manifest file entries listing the transport segments and their locations within the CDN. For example, in certain cases each entry in the manifest file may include a relative location for the corresponding transport segment, the relative location being relative to the location of the manifest file within the CDN. In other cases, the location of the transport segment may instead be an absolute location, such as a complete network path, identifying the location of the transport segment to the content.

In implementations according to the present disclosure, two or more manifest files are generated for a given piece of content. In certain implementations, for example, the content is also duplicated across two or more storage platforms, each of which is configured to operate as an origin server for providing the content to a CDN and each of which is associated with a corresponding manifest file for the respective copy of the content. The storage platforms may be geographically diverse such that each storage platform is suited to provide the content to specific geographic regions of the CDN. In a simple example, a first storage platform may be located in New York and primarily serve the east coast of the United States, while a second storage platform may be located in Los Angeles and primarily serve the west coast of the United States. Accordingly, the manifest files of the first storage platform will include network locations for copies of content segments maintained on the first storage platform while the manifest files of the second storage platform will include network locations for copies of the same content segments maintained on the second storage platform. For live or otherwise changing content, as the content provider computing device writes transport segments to each storage platform, the corresponding manifest file is updated or replaced such that new entries including any new transport segments and their network locations are included.

Multiple manifest files for the same content may also be generated for other reasons including, without limitation, redundancy and to accommodate multiple bit rates and formats of particular content. Accordingly, a system in accordance with the present disclosure may include multiple manifest files, some or all of the entries of which may include different location for the respective content, or the same location information for a particular transport segment. Moreover, more than one version of a manifest file for particular content or segment may be generated, each version of the manifest file corresponding to a different version of the same content.

When a device, referred to herein as a client device, requests content from the CDN, the client device may be provided with a manifest file corresponding to the requested content. For purposes of this disclosure, such a manifest file is referred to as a "primary manifest file."

In response to receiving the primary manifest file, the client device submits requests for transport segments according to the primary manifest file. For example, the primary manifest file may specify an order and corresponding locations for each of the transport segments of the content and the client device may submit requests accordingly. In certain implementations, for example, the primary manifest file may include a location agnostic universal resource locator (URL) or similar reference and the client device may submit a request including the location agnostic URL to the CDN. In response, the CDN may then determine the best location from which to serve the content based on, among other things, geographic proximity, performance criteria, cost-related criteria, or other criteria, alone or in combination.

Each transport segment is then retrieved from the storage platform and delivered over the CDN to the client device. In certain instances, the transport segments may be cached in one or more devices of the CDN network, such as an edge server, such that the request for the transport segment is satisfied by retrieving the cached transport segment from the CDN devices as opposed to retrieving the transport segment from the storage platform directly. Even in cases where content has yet to be cached in the CDN, the content is often retrieved from the origin and cached prior to delivery.

Under certain circumstances, the primary manifest file may be incomplete or otherwise contain errors. For example, connectivity issues, such as equipment failures, power outages, excessive network loading, and the like, may occur during writing of the transport segment to the storage platform and may result in a failure of the write operation. When such a failure occurs, an entry noting the discontinuity is generally inserted into the manifest file. As a result, playback by a client device requesting transport segments according to the primary manifest file may be interrupted when the discontinuity is reached.

CDN operators are limited in how they can address such interruptions. For certain interruptions, a CDN operator may do nothing and the client device may simply move on to the next transport segment of the manifest file such that the client device misses a portion of the content corresponding to the problematic transport segments. In the context of audio or video content, such an approach can cause stalling and skipping of the content, leading to an unsatisfactory user experience.

For more severe interruptions, a CDN operator may manually force the client device to retrieve the content from a second storage platform or a CDN device storing a cached version of the content stored on the second storage platform. More specifically, the CDN may provide to the client device a new manifest file for retrieving the content from the second storage platform. The client device may then proceed with acquiring the content according to the new manifest file. Synchronizing the client experience so that content is not missed or the content is not restarted can be challenging. Notably, such an approach also adds additional traffic to the portion of the CDN associated with the second storage platform, thereby eliminating many of the efficiencies gained from a CDN system. Moreover, for particularly popular content, such as popular live-streamed sporting or entertainment events, the additional traffic may cause significant stress on the portion of the CDN to which the client devices are redirected, increasing the likelihood of additional failures related to writing transport segments and generating and distributing corresponding manifest files.

In light of the foregoing issues, among others, systems and methods disclosed herein address primary manifest file errors by first identifying errors or discontinuities in the primary manifest file and then merging the primary manifest file with one or more additional (second) manifest files for the same content to generate a combined manifest file. The combined manifest file includes entries from the primary manifest file but inserts entries from the one or more second manifest files into discontinuities or other omissions of the primary manifest file. Accordingly, a client device provided with the combined manifest file will retrieve the majority of transport segments in accordance with the primary manifest file, but will retrieve any problematic transport segments from one or more secondary storage platforms or CDN devices containing cached versions of the transport segments maintained on the secondary storage platforms. As a result, service of the content to the client device is relatively uninterrupted with minimal impact on the portion of the CDN corresponding to the second storage platform.

The function of merging manifest files is carried out by what is referred to herein as a "manifest normalizer." As further described in this disclosure, the manifest normalizer may take various forms and may be located at various points within a content distribution system. In general, however, the manifest normalizer examines a manifest file to determine if the manifest file contains any errors, omissions, or discontinuities. If no such errors are present, the manifest normalizer returns the manifest file for delivery and implementation by the client device. If, on the other hand, the manifest normalizer identifies one or more errors in the manifest file, the manifest normalizer compares the primary manifest file to one or more second manifest files for obtaining the same content or copies thereof. The manifest normalizer then generates a combined manifest file that is a union between the entries of the primary manifest file and the one or more second manifest files by supplementing the entries of the primary manifest file with those of the one or more second manifest files corresponding to the errors or discontinuities in the primary manifest file. More specifically, network location information for the content segments missing from the primary manifest file are copied from the one or more second manifest files such that the combined manifest file includes entries for each segment of the content.

In certain implementations, the manifest analyzer analyzes the primary manifest file and generates a corresponding combined manifest file during the process of writing content segments to a storage platform. In such implementations, the manifest normalizer may replace the primary manifest file of the storage platform with the combined manifest file such that the combined manifest may then be provided for any subsequent requests for the content. In other implementations, the manifest normalizer analyzes the primary manifest file in response to requests for the content corresponding to the manifest file. In such implementations, the manifest normalizer may act as an intermediary of sorts between the client device and the CDN. More specifically, in response to a request for a primary manifest file from the client device, the manifest normalizer may retrieve the primary manifest file and analyze the primary manifest file for any discontinuities before forwarding the primary manifest file to the client device. If a discontinuity is identified, the manifest normalizer may generate a combined manifest file including location information obtained from other manifest files and then provide the combined manifest file to the client device instead of the primary manifest file.

In certain implementations, the manifest normalizer is implemented as part of a CDN. For example, the manifest normalizer may be configured to access or retrieve a primary manifest file from a storage platform in response to a content request from a client device. In other implementations, the manifest normalizer is implemented in a client device. For example, the manifest normalizer may examine primary manifest files for errors and discontinuities when the primary manifest file is received by the client device but before the client device begins submitting requests for the transport segments. In still other implementations, the manifest normalizer is implemented at a computing device associated with a content provider. For example, as transport segments are written to disparate storage platforms by the content provider and corresponding manifest files are generated, the manifest normalizer may audit the manifest files and, to the extent an error is identified, generate a combined manifest file, and replace the manifest files with the combined manifest file addressing the errors. The manifest normalizer may also be implemented as a service available to computing devices associated with the CDN.

FIG. 1 is a schematic illustration of an example network environment 100 for storing and distributing content to one or more users according to the present disclosure. In one implementation, a CDN 102 includes multiple CDN devices 104-114. The CDN devices 104-114 include various computing devices configured to store and/or transmit data. One of more of the CDN devices 104-114 may be configured to communicate with one or more external networks. In FIG. 1, for example, each of CDN devices 104, 110, 112, and 114 are edge servers that are communicatively coupled with external networks and/or computing devices. More specifically, the CDN devices 104 and 114 are communicatively coupled to a first storage platform 124 and a second storage platform 132, respectively, the CDN device 110 is communicatively coupled to a client network 116, and the CDN device 112 is communicatively coupled to an external network 140. The external network 140 is intended to represent any number of other networks and computing devices coupled to the CDN 102. Accordingly, the external network 140 may include, without limitation, one or more of content provider networks, storage platforms, client networks, and other CDNs.

The network environment 100 further includes a content provider network 120 including a content provider computing device 122. The content provider computing device 122 is communicatively coupled to each of the first storage platform 124 and the second storage platform 132. The first storage platform 124 includes a first storage platform computing device 126 in communication with a first content store 128 and a first manifest file collection 130. The first manifest file collection 130 includes at least one first manifest file 131 corresponding to content stored in the first content store 128. Similarly, the second storage platform 132 includes a second storage platform computing device 134 in communication with a second content store 136 and a second manifest file collection 138 including at least one second manifest file 139. Although described herein as being stored on their respective storage platforms, manifest files may also be stored in other locations within the network environment 100. For example, in certain implementations, manifest files may be stored in decentralized locations and/or cached in various locations throughout the network environment 100. Accordingly, to the extent the present disclosure refers to the location of a manifest file, such references should not be interpreted to be strictly limited to storage platforms.

Content provided by the content provider computing device 122 is generally stored on storage platforms, such as the first storage platform 124 and the second storage platform 132 for retrieval by the CDN 102. More specifically, the content provider computing device 122 divides the content into multiple segments, also referred to herein as "transport segments" or "media segments." A given transport segment may correspond to a discrete portion of the content having a predetermined size, duration, or other metric.

Each of the first storage platform 124 and the second storage platform 132 may function as origin servers. More specifically, the first storage platform 124 and the second platform server 132 may store original versions of content that are retrieved by and cached within one of more of the CDN devices 104-114. In certain implementations, each of the first storage platform 124 and the second storage platform 132 may be integrated into the content provider network 120. Alternatively, the first storage platform 124 and the second storage platform 132 may be maintained by a third party and communicatively coupled to each of the content provider network 120 and the CDN 102. In other implementations, the content provider computing device 122 may be an origin server associated with a particular content provider. In such implementations, content may be stored at the origin and subsequently distributed to the storage platforms 124, 132.

The same content may be stored in disparate storage platforms to efficiently facilitate distribution of the stored content. For example, in the network environment 100, the same content may be stored in each of the first storage platform 124 and the second storage platform 132. More specifically, each transport segment is transmitted to the first storage platform computing device 126 and the second storage platform computing device 134 for storage in the first content store 128 and the second content store 136, respectively. To improve content distribution efficiency, the storage platforms 124, 132 may provide the content to different sections of the CDN 102. For example, in certain implementations, each of the first storage platform 124 and the second storage platform 132 may primarily serve content to sections of the CDN 102 corresponding to cities, states, or other geographical regions. A given storage platform may also store multiple versions of the same content, with each version of the content having a different format. For example, multiple instances of the same content may be stored in a storage platform, with each instance of the content having a different bit rate.

As transport segments are stored in each of the first storage platform 124 and the second storage platform 132, corresponding entries are added to the first manifest file 131 and the second manifest file 139, respectively, with each entry including an identifier and a location of the corresponding transport segment within the CDN 102. New entries may be added to the manifest files or the manifest files may be regenerated as each transport segment is written to the corresponding storage platform. When the content corresponds to a live stream, for example, the manifest file may be updated and/or recreated as each new transport segment is generated by the content provider computing device 122 and stored in the storage platforms 124, 132. Alternatively, in implementations when the content is static, a single manifest file may be created for the transport segments stored in the storage platforms 124, 132. In implementations in which multiple versions of media content are stored in the storage platforms 124, 132 (such as when multiple versions of content, each having different bit rates are stored in the storage platforms 124, 132), individual manifest files may be created for each version of the content that is stored.

Manifest files, such as manifest files 131 and 139, may be written in a markup language, such as extensible markup language (XML), and may be generated in accordance with one or more predefined schemas. Each manifest file generally includes information regarding the server and host on which the content is stored as well as an entry for each of the transport segments of the content corresponding to the manifest file. The server information generally includes a primary hostname, IP address, or similar identifier for the server. Similarly, the host information may include a domain name server (DNS) name or IP address of the host and may further include attributes corresponding to, among other things, a port or protocol to be used when communicating with the host. Each entry corresponding to a transport segment includes a source of the transport segment, which may be a direct path of the transport segment or a path relative to the host address. Additional address information may also be included in entries for the transport segments including, without limitation, an alternative path to be used if the source path is found to be invalid.

The process of retrieving stored content generally includes requesting and receiving a manifest file corresponding to the content then subsequently requesting and receiving the transport segments of the content in accordance with the manifest file. In the context of live-streaming or similar dynamic content, new manifest files may be continuously generated to include new transport segments as they are generated. As a result, the process of retrieving the stored content in a live-streaming context may include alternating between requesting and receiving an updated manifest file and requesting and receiving one or more transport segments.

To request a manifest file or transport segment, a client device 118 first submits a request in the form of a qualified domain name or similar reference to a domain name system (DNS) resolver 152. For example, the client device 118 may generate and transmit a request for content including a corresponding URL by clicking a link in a web browser or selecting content to view within a media player, among other actions. When requesting specific transport segments, the URL may also be generated from network location information stored within the manifest file. In response to receiving a request from the client device 118, the DNS resolver 152 returns an address, such as an IP address, to the client device 118 that corresponds to a server from which the client device 118 may obtain the requested manifest file or transport segment. Alternatively, the DNS resolver 152 may determine that the URL is associated with a host of the CDN 102 and may redirect the request to an authoritative DNS name server 154 of the CDN 102. The authoritative DNS name server 154 then determines from which of the various CDN devices 104-114 the manifest file or transport segment is to be served to the client device 118 and returns a corresponding address. In certain instances, the transport segment or manifest file may already be cached at a CDN device. Alternatively, the content and manifest file may be retrieved from the appropriate storage platform and cached at a chosen CDN device. In either case, the DNS name server 154 returns an address, such as an IP address, to the client device 118 corresponding to the CDN device or storage platform from which the manifest file or transport segment is to be retrieved. As previously noted, the process of selecting a CDN device 104-114 to provide the requested manifest file or transport segment may include selecting one of the CDN devices 104-114 based on geographic proximity to the client device 118, load balancing of the network, and other performance, logistical, and business considerations.

In one example, during normal operation, the DNS name server 154 or other computing device of the CDN 102 determines that a manifest file requested by the client device 118 is associated with content stored in the first storage platform 124. If the first manifest file 131 is not yet cached within the CDN 102, the CDN 102 retrieves the first manifest file 131 from the first storage platform 124, caches the first manifest file 131 within the CDN 102, and provides an address to the network location of the cached first manifest file to the client device 118. After retrieving the cached first manifest file, the client device 118 may obtain the individual transport segments included in the first manifest file 131 by submitting successive transport segment requests according to the network location information stored within the first manifest file 131. Similar to the original request for the manifest file, the DNS name server 154 or other computing device of the CDN 102 determines whether the requested transport segment is cached within the CDN 102. If not, the transport segment is retrieved from the appropriate storage platform 124, 132 to be cached within the CDN 102 and an address for the cached transport segment is returned to the client device 118. The client device 118 may then play or otherwise execute the retrieved transport segment. This process is then repeated for subsequent transport segments listed in the first manifest file 131.

The process of writing a transport segment from the content provider network 120 to each of the first storage platform 124 and the second storage platform 132 may encounter errors such that one or more transport segments are incompletely transferred or not transferred at all. For example, communication between the content provider computing device 122 and the first storage platform computing device 126 may be interrupted due to network connectivity issues, equipment failure, excessive loading, and the like. In such situations, a discontinuity or similar entry may be added to the manifest file as a placeholder for the problematic transport segment(s).

To address such manifest file errors, the network environment 100 includes a manifest normalizer 150 that is capable of combining multiple manifest files to generate a combined manifest file that accounts for gaps or discontinuities within the individual manifest files, such as may occur during interruptions in the writing process. In the implementation illustrated in FIG. 1, the manifest normalizer 150 is incorporated as part of the CDN 102, however, as discussed in other sections of this disclosure, the manifest normalizer 150 may be incorporated into other portions of the network environment 100. The manifest normalizer 150 analyzes a manifest file for discontinuities and, if one or more discontinuities are identified, generates a combined manifest file in which the discontinuities are addressed using data retrieved from one or more other manifest files. For example, the discontinuities may be resolved by inserting network location information for obtaining a copy of the transport segment or a different version of the transport segment (such as a version of the transport segment at a different bit rate).

For example, with reference to the network environment 100 of FIG. 1, the manifest normalizer 150 is generally adapted to retrieve or otherwise receive the first manifest file 131 and analyze the first manifest file for errors. If the manifest normalizer 150 does not identify any errors, the manifest normalizer 150 may simply forward the first manifest file 131 as necessary to a client device requesting the content corresponding to the manifest file. If, on the other hand, the manifest normalizer 150 identifies one or more discontinuities or other errors in the first manifest file 131, the manifest normalizer 150 may retrieve the second manifest file 139, which corresponds to the same content as the first manifest file 131. After retrieving the second manifest file 139, the manifest normalizer 150 may then generate a combined manifest file by joining the first and second manifest files 131, 139. The process of joining the first and second manifest files 131, 139 to generate the combined manifest file may generally include making a copy of the first manifest file and inserting entries of the second manifest file 139 into the copy of the first manifest file corresponding to the missing transport segments. Insertion of the second manifest file entries into the copy of the first manifest file may also include generating an absolute location for the added segments and inserting the absolute location into the added manifest file entries. The absolute location may be generated, for example, by copying an existing absolute location of the added segments or, if such a location is not available, by appending the relative location of the added entries to the location of the second manifest file.

If the combined manifest file resolves the error, the manifest normalizer 105 may forward the combined manifest file to the client device requesting the content. Alternatively, if the combined manifest file retains one or more discontinuities, additional manifest files from other storage platforms may be retrieved and incorporated into the combined manifest file until all discontinuities are resolved. The process of forwarding the first manifest file or the combined manifest file may vary depending on the particular implementation of the manifest normalizer 150. For example, in certain implementations, the manifest normalizer 150 may be configured to forward the first or combined manifest files directly to the client device 118. In other implementations, the manifest normalizer 150 may forward the first or combined manifest files for storage in one or more storage platforms or computing devices of the CDN 102.

In the implementation illustrated in FIG. 1, for example, the manifest normalizer 150 is illustrated as being incorporated into the CDN 102. In such implementations, the manifest normalizer 150 may be adapted to analyze manifest files and generate combined manifest files as necessary in response to content requests received by the CDN 102 from the client device 118. As content and a corresponding manifest file is migrated to the CDN 102 in response to a request from the client device 118, the manifest normalizer 150 may identify any discontinuities or errors in the manifest file and generate a combined manifest file as previously discussed. The combined manifest file may then be forwarded to the appropriate computing device of the CDN 102 to be cached instead of caching the original manifest file. In another implementation, content and any corresponding manifest files may be migrated to the CDN 102 as stored in the storage platforms 124, 132; however, when a manifest file is served from a computing device of the CDN 102, the manifest file may first be sent to the manifest normalizer 150 which analyzes the manifest file for errors. If no errors are identified, the manifest normalizer 150 may forward the manifest file to the client device 118. Otherwise, the manifest normalizer 150 may generate a combined manifest file to address any identified errors and forward the combined manifest file to the client device 118.

After the manifest normalizer 150 generates a combined manifest file, the manifest normalizer 150 may cause the first manifest file to be replaced with the combined manifest file. For example, in certain implementations, the manifest normalizer 150 may replace the version of the first manifest file located on the storage platform 124 with the combined manifest file. The manifest normalizer 150 may further initiate deletion or replacement of any cached versions of the first manifest file maintained in the CDN 102. To the extent deletion occurs, subsequent requests for the content may result in the combined manifest file being obtained from the storage platform 124 and subsequently cached in the CDN 102 such that the CDN 102 does not store cached versions of the discontinuous first manifest file.

The particular method by which the manifest normalizer 150 identifies errors in a given manifest file may vary. In certain implementations, when the content provider computing device 122 encounters an error in writing a particular transport segment to a storage platform, the content provide computing device 122 may insert an entry into the manifest file, where the entry has a predetermined format indicating that an error had occurred. For example, the computing device 122 may be adapted to insert a "discontinuity" entry in place of the transport segment information. In such implementations, the manifest normalizer 150 may identify errors in a retrieved manifest file by reading the retrieved manifest file and looking for discontinuity entries. To the extent such entries exist, the manifest normalizer 150 may generate a combined manifest file in which the discontinuity entries are instead replaced by corresponding entries from a second manifest file. In other implementations, the content provide computing device 122 may be adapted to embed an error code or other error log information into the manifest file indicating whether a write error or other interruption occurred during writing of transport segments to a storage platform. Such codes or log information may generally indicate whether such an error occurred and, more specifically, which transport segments were affected by the write error/interruption. Accordingly, in response to retrieving a manifest file, the manifest normalize 150 may check for such error codes or log information to determine if a combined manifest file is to be generated and, if so, to identify which entries of the second manifest file are required for the combined manifest file to be generated by the manifest normalizer.

Figure 2:
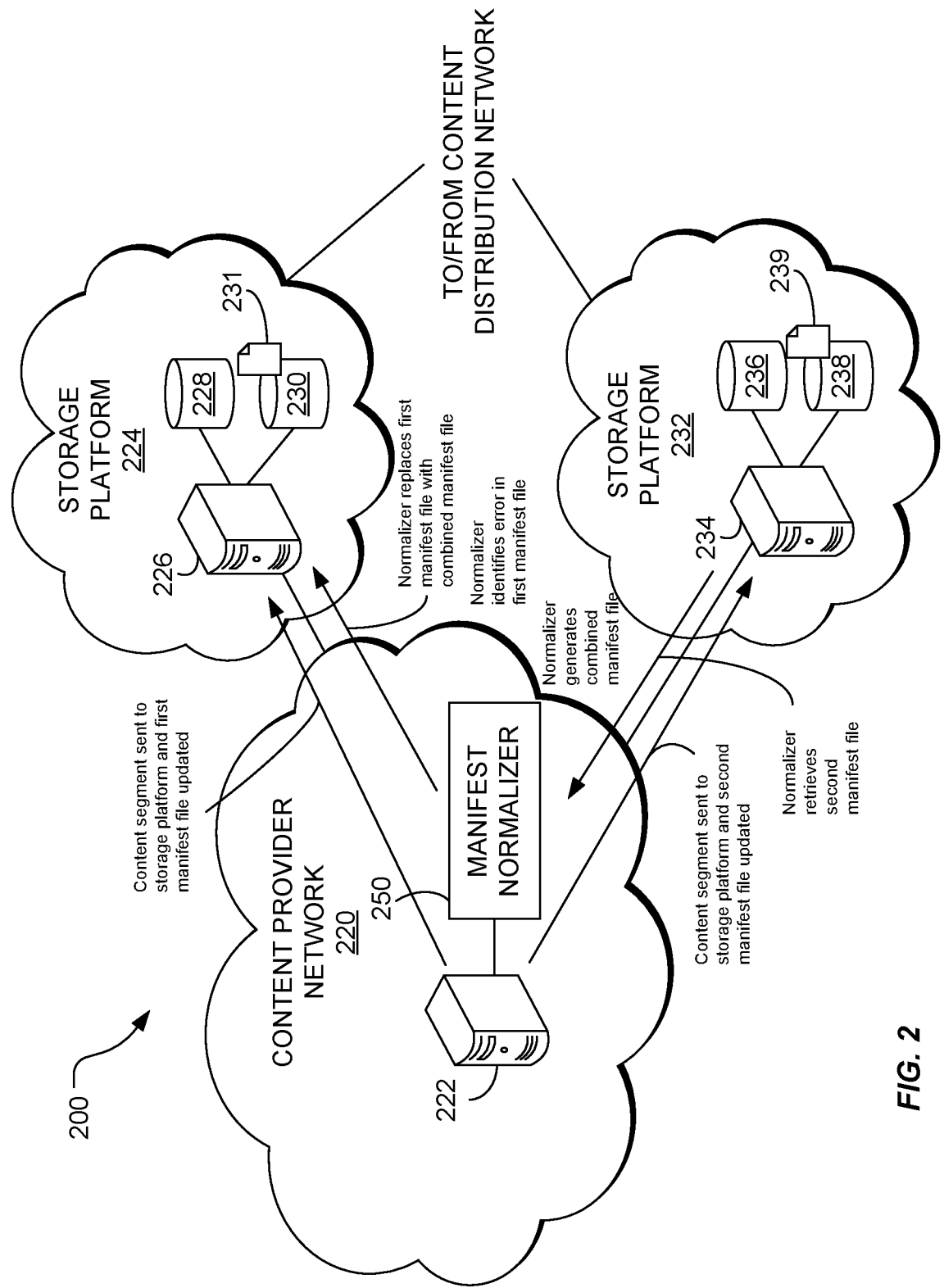
FIG. 2 is a schematic illustration of a partial view of a second network environment including functionality to resolve errors in manifest files

FIG. 2 is a partial view of a second network environment 200 for distributing content. The example of FIG. 2 is intended to illustrate one implementation of a manifest normalizer 250 for addressing manifest file errors during the uploading of content by a content provider to an origin server or similar storage platform. The second network environment 200 includes a content provider network 220 including a content provider computing device 222. The content provider network 220 is communicatively coupled to each of a first storage platform 224 and a second storage platform 232. The first storage platform 224 includes a first storage platform computing device 226 in communication with a first content store 228 and a first manifest collection 230 including a first manifest file 231. The second storage platform 232 includes a second content store 236 and a second manifest collection 238 including a second manifest file 239. Each of the first storage platform 224 and the second storage platform 232 are communicatively coupled to a CDN, such as the CDN 102 shown in FIG. 1. In contrast to the implementation illustrated in FIG. 1 in which the manifest normalizer 150 was included in the CDN 102, the second network environment 200 includes a manifest normalizer 250 that is included in or otherwise in communication with the content provider network 220.

During write operations, a content provider computing device 222 generates and transmits content segments to each of the first and second storage platforms 224, 232. As the segments are written to the first and second storage platforms 224, 232, corresponding entries are generated in a first manifest file 231 and a second manifest file 239, respectively. For example, in certain implementations, new entries may be appended to the manifest files 231, 239 or new versions of the manifest files 231, 239 may be generated as new segments are uploaded to the storage platforms 224, 232. The first storage platform 224 and the second storage platform 232 may be, but are not necessarily, geographically diverse and may be, but are not necessarily, adapted to provide the content to specific geographic regions of a CDN. The segments uploaded to each of the first and second storage platforms 224, 232 generally correspond to copies of the content generated by the content provider computing device 222.

In certain implementations, the content provider computing device 222 may generate and upload multiple versions of content to one of the storage platforms 224, 232 or may store different versions of the content on the storage platforms 224, 232. For example, the content provider computing device 222 may generate transport segments corresponding to the same content but sampled at different bitrates or having different localization characteristics. In instances where the content provider computing device 222 generates different versions of the same content, each version is essentially treated as a distinct piece of content in that each version is broken into corresponding transport segments that are then uploaded to one or both of the storage platforms 224, 232 along with a corresponding manifest file.

As the content provider computing device 226 performs write operations, the manifest normalizer 250 may monitor the write operations to determine whether or not the operations are completed successfully. Such monitoring may be performed in various ways but, in general, includes identifying at least one of discontinuities in a manifest file or events that may lead to discontinuities in a manifest file. For example, in some implementations, the manifest normalizer 250 may be adapted to receive an alert or similar notification (such as an alert or notification from one or more of the content provider computing device 222, the first storage platform 224, and the second storage platform 232) when a write operation for a transport segment fails, when communication between the content provider computing device 222 and one of the storage platforms 224, 232 is interrupted, or when other such interruptions occur. In other implementations, the manifest normalizer 250 may wait until some or all of the write operations for a given piece of content are completed before inspecting the manifest file corresponding to the transport segments for errors and discontinuities.

In certain implementations, the identification of discontinuities in a manifest file may be based on an update interval of the manifest file. For example, each transport segment of content may have a fixed duration, such as five seconds, such that the manifest file is updated with a new entry at a similar frequency. Accordingly, if an update has not occurred after the expected interval duration (e.g., after seven seconds when an update is expected every five seconds), the manifest file may be considered stale and the corresponding entry of the manifest file may be declared, marked, or otherwise identified as a discontinuity.

When the manifest normalizer 250 identifies a discontinuity in a manifest file (or an interruption to a write operation), the manifest normalizer 250 may initiate remedial functions in order to generate a combined manifest file in which the manifest file entries for any missing or otherwise problematic segments are modified with information from corresponding entries of one or more second manifest files. In certain implementations, the manifest normalizer 250 may wait until all write operations for a given piece of content are completed before initiating generation of a combined manifest file. By doing so, the manifest normalizer 250 operates more efficiently and avoids generating a manifest file that includes unnecessary redirections.

In response to identifying an error in the first manifest file 231, the manifest normalizer 250 may retrieve the second manifest file 239 and create a combined manifest file in which the missing or problematic entries of the first manifest file 231 are replaced or updated with information form the corresponding entries of the second manifest file 239. The process of generating the combined manifest file may also include accessing manifest files from one or more other storage platforms or computing devices of the CDN in the event that combining the first and second manifest files 231, 239 does not result in a complete combined manifest file.

Figure 3:
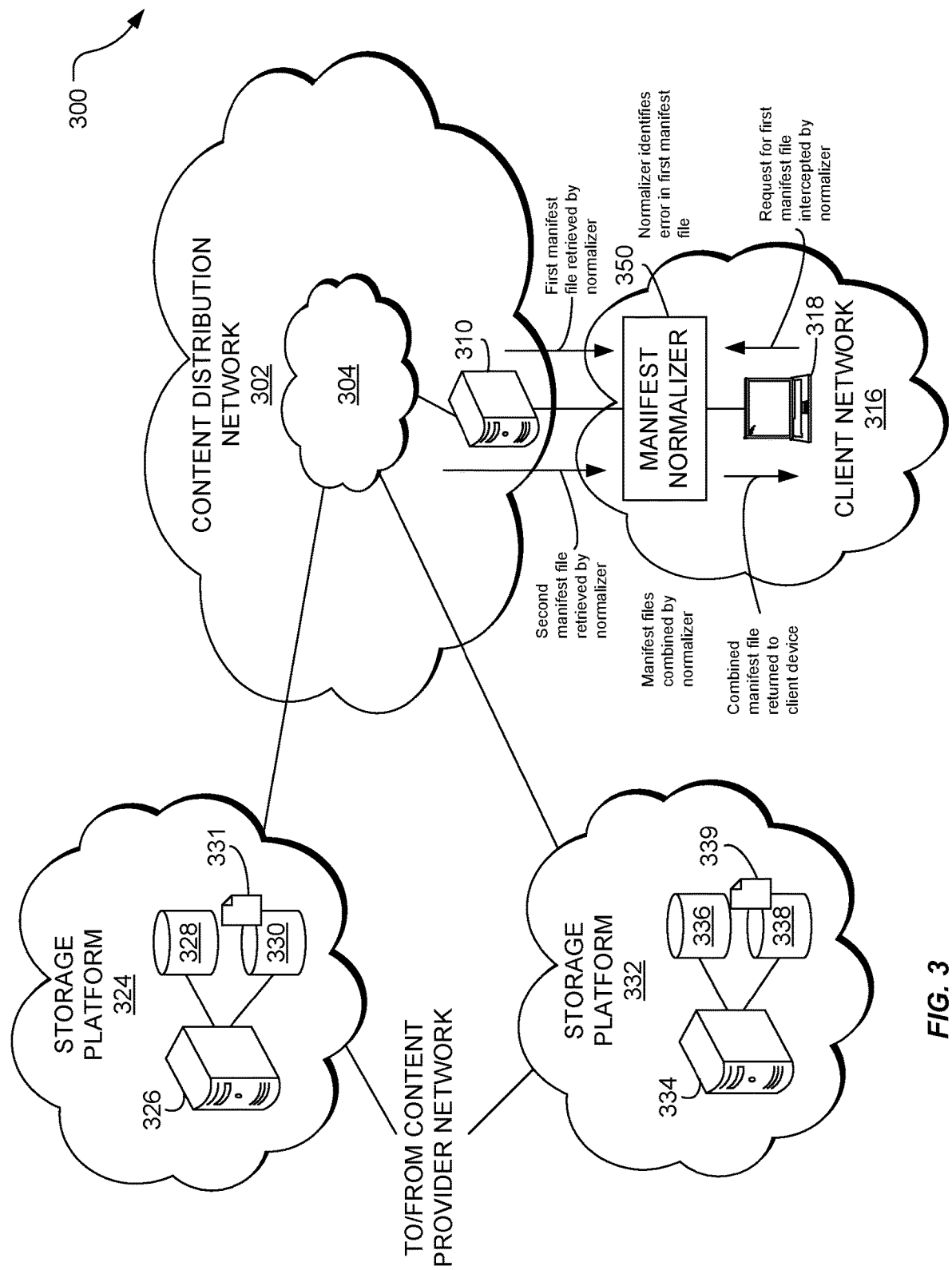
FIG. 3 is a schematic illustration of a partial view of a third network environment including functionality to resolve errors in manifest files.

FIG. 3 is a partial view of a third network environment 300. The example of FIG. 3 is intended to illustrate an implementation of a manifest normalizer 350 for addressing manifest file errors during the retrieval of content from a content distribution network 302.

The network environment 300 includes a client network 316 including a client computing device 318, which is communicatively coupled to a CDN device 310 of a CDN 302. The CDN 302 may include one or more additional CDN devices represented as a sub-network 304. The CDN 302 is further in communication with each of a first storage platform 324 and a second storage platform 332. The first storage platform 324 includes a first storage platform computing device 326 in communication with a first content store 328 and a first manifest collection 330 including a first manifest file 331. The second storage platform 332 includes a second content store 336 and a second manifest collection 338 including a second manifest file 339. The client computing device 318 includes or is in communication with a manifest normalizer 350. For example, the manifest normalizer 350 may be an application executed by the client computing device 318 or a separate computing device that is communicatively coupled to or otherwise accessible to the client computing device 318.

In one implementation, the client computing device 318 submits a request for a manifest file for content deliverable over the CDN 302. For example, in response to a request for the content, the client device 318 may receive an IP or similar address corresponding to a computing device of the content distribution network 302 on which a manifest file for the requested content is stored. In certain implementations, the address may point to a cached version of the manifest file stored within the CDN 302. Alternatively, the address may point to an origin server or similar computing device of a storage platform on which the manifest file is stored, such as a first origin server 326 and a second origin server 334 of the first and second storage platforms 324, 332, respectively.

In certain implementations, the client computing device 318 may send the manifest file request to the manifest normalizer 350. The manifest normalizer 350 may then retrieve the requested manifest file and analyze the manifest file for any errors or other discontinuities. For example, with reference to FIG. 3, the client device 318 may submit a request for the first manifest file 331 to the manifest normalizer 350. In response, the manifest normalizer 350 retrieves the first manifest file 331 (or a cached copy thereof) and analyzes the first manifest file 331 for any discontinuities or other errors. If no such errors are present, the manifest normalizer 350 returns the first manifest file 331 to the client computing device 318. If, on the other hand, the manifest normalizer 350 identifies one or more discontinuities, the manifest normalizer 350 may retrieve one or more other manifest files corresponding to the requested content. For example, the manifest normalizer 350 may retrieve the second manifest file 339 stored in the second storage platform 332. The manifest normalizer 350 may then combine the first manifest file 331 with the second manifest file 339 to generate a combined manifest file that is then returned to the client computing device 318.

In other implementations, the manifest normalizer 350 may be adapted to receive and/or intercept manifest files sent to the client device 318 as opposed to manifest file requests sent by the client device 318. In such implementations, the manifest normalizer 350 may similarly analyze any incoming manifest files for errors. If no errors are identified, the manifest file may be forwarded to the client device 318. Otherwise, the manifest normalizer 350 may retrieve one or more second manifest files, generate a combined manifest file that addresses the errors, and transmits the combined manifest file to the client device 318.

The implementations described in each of FIGS. 1-3 include the manifest normalizer as part of the CDN, the content provider network, and the client network, respectively. In other implementations, the manifest normalizer may be a service accessible by computing devices of one or more of the CDN, the content provider network, and the client network. For example, the manifest normalizer may be implemented as a manifest normalizer web service accessible by computing devices of the content provider network, the CDN, and the client network. In one implementation, the service may take a content request as an input and return a manifest file, which may be a combined manifest, in response to the request. In another implementation, the service may receive a manifest file as input, analyze the manifest file, and provide either the manifest file if no discontinuities are present or a combined manifest file in which any discontinuities are filled from other manifest files retrieved by the service.

Figure 4:
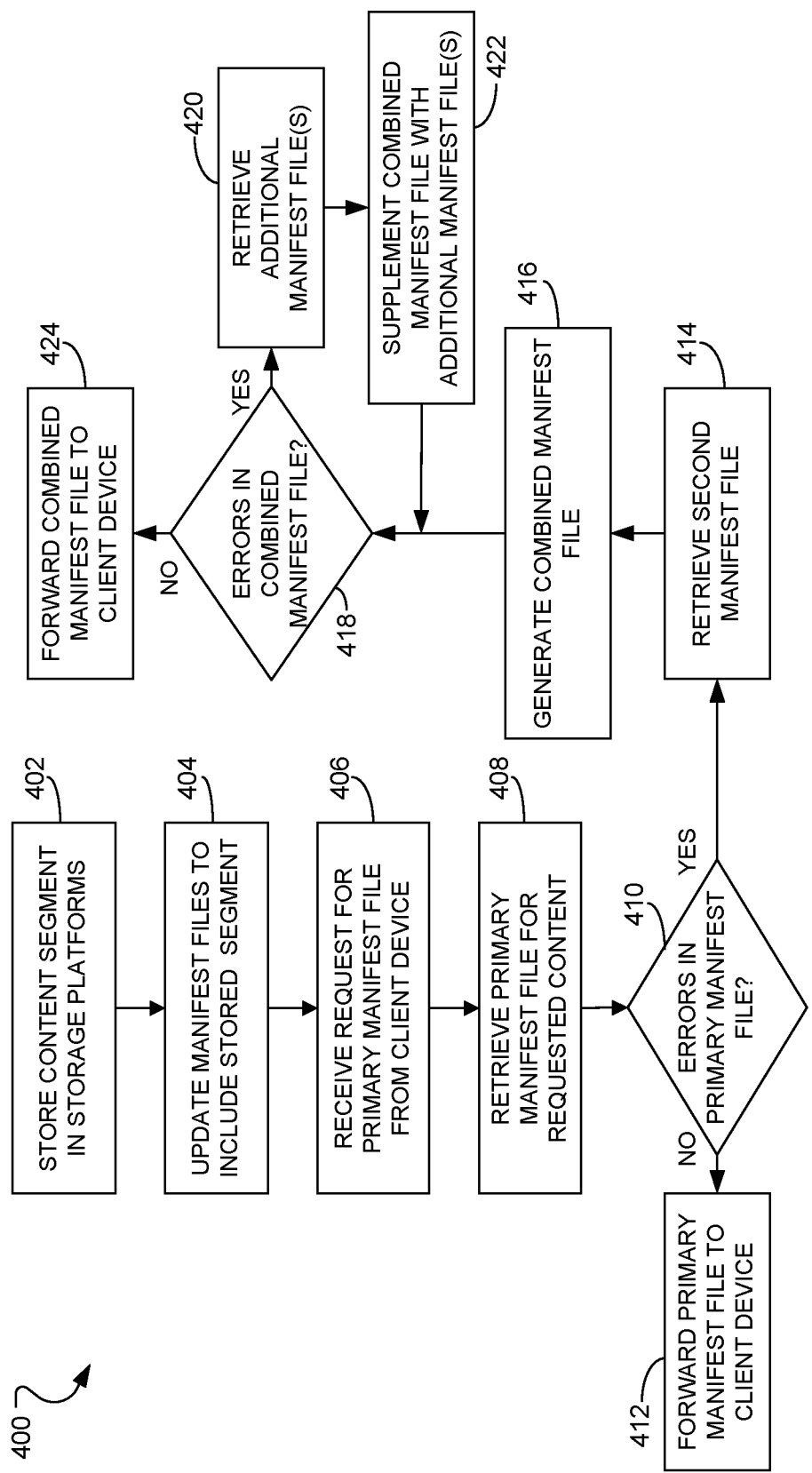
FIG. 4 is a flowchart illustrating a method, or combination of methods, for resolving errors in manifest files.

FIG. 4 is a flow chart illustrating an example method 400 of resolving errors in a manifest file corresponding to stored content. With reference to FIG. 1, the method 400 includes writing a segment of content to each of a first content store 128 and a second content store 136 (operation 402). For example, the content provider computing device 122 of the content provider network 120 may generate content, break the content into discrete segments, and write the segments to each of the first content store 128 and the second content store 136 of the first storage platform 124 and the second storage platform 132, respectively.

After writing the segments, a first manifest file 131 of the first storage platform 124 and a second manifest file 139 of the second storage platform 132 may be updated to reflect storage of the segments (operation 404). Updating the first manifest file 131 and the second manifest file 139 may include initially generating the manifest files 131, 139 or may include updating the manifest files 131, 139 with additional entries. In certain implementations, the first and second manifest files 131, 139 are updated after each segment is written to the content stores 128, 136, respectively. Alternatively, the first and second manifest files 131, 139 may be updated periodically after more than one segment has been stored. For example, in certain implementations, all transport segments of the content may be written to each of the first and second content stores 128, 136 before updating or creating the first and second manifest files 131, 139, respectively.

After storage of the segments and manifest files, a request for a primary manifest file may be received from a client device 118 (operation 406). For example, in certain implementations, the client device 118 may request content by submitting a URL or similar address to a DNS resolver, such as the DNS resolver 150 of FIG. 1. The DNS resolver 150 or an authoritative DNS name server of a CDN (such as the authoritative DNS name server 152 of CDN 102) may then return an IP address from which the client device 118 may retrieve a primary manifest file corresponding to the requested content. For example, the IP address may correspond to a computing device of the CDN 102 or a storage platform on which the primary manifest file or a copy thereof is stored. In response to the manifest file request, the primary manifest file is retrieved (operation 408). For purposes of the example method 400, the primary manifest file is considered to be the first manifest file 131.

The primary manifest file is then analyzed by a manifest normalizer 150 to determine whether the primary manifest file contains any errors, such as discontinuities (operation 410). If the manifest normalizer determines the primary manifest file is complete and lacks any errors, the primary manifest file is forwarded to the client device 118 for processing (operation 412). However, if the manifest normalizer determines the primary manifest file is incomplete or otherwise includes errors, the manifest normalizer generates a combined manifest file. More specifically, the manifest normalizer 150 retrieves a second manifest file corresponding to the same content (operation 414), such as the second manifest file 139 of FIG. 1, and generates a combined manifest file by combining the first manifest file 131 with the second manifest file 139 (operation 416). In certain implementations, the second manifest file may correspond to a different version of the content, such as a version of the content having a lower bit rate or other characteristics.

In certain implementations, combining the first manifest file 131 and the second manifest file 139 may include inserting information from the second manifest file 139 into the first manifest file 131. By doing so, the entries of the first manifest file 131 having errors are replaced or supplemented with information from the second manifest file 139 such that when the manifest file is executed, the problematic segments of the first manifest file 131 are instead retrieved in accordance with the second manifest file 139 from an alternative network location. For example, in certain implementations entries of the first manifest file 131 may include a field for an absolute address of a segment. Accordingly, combining the first and second manifest files 131, 139 may include generating an absolute address for a segment from information stored within the second manifest file 139 and inserting the absolute address into a corresponding entry of the first manifest file 131.

The manifest normalizer may then determine whether the combined manifest file still includes errors (operation 418). In certain implementations, if the combined manifest file resolves all errors of the primary manifest file, the combined manifest file is forwarded to the client device 118. If, on the other hand, the combined manifest file retains errors, the manifest normalizer 150 may retrieve one or more additional manifest files corresponding to the requested content (operation 420) and supplement the combined manifest file with the additional manifest files (operation 422). In certain implementations, this process may be repeated until all errors in the primary manifest file are addressed. When all errors have been addressed, the final combined manifest file is forwarded to the client computing device 118 (operation 424).

Figure 5:
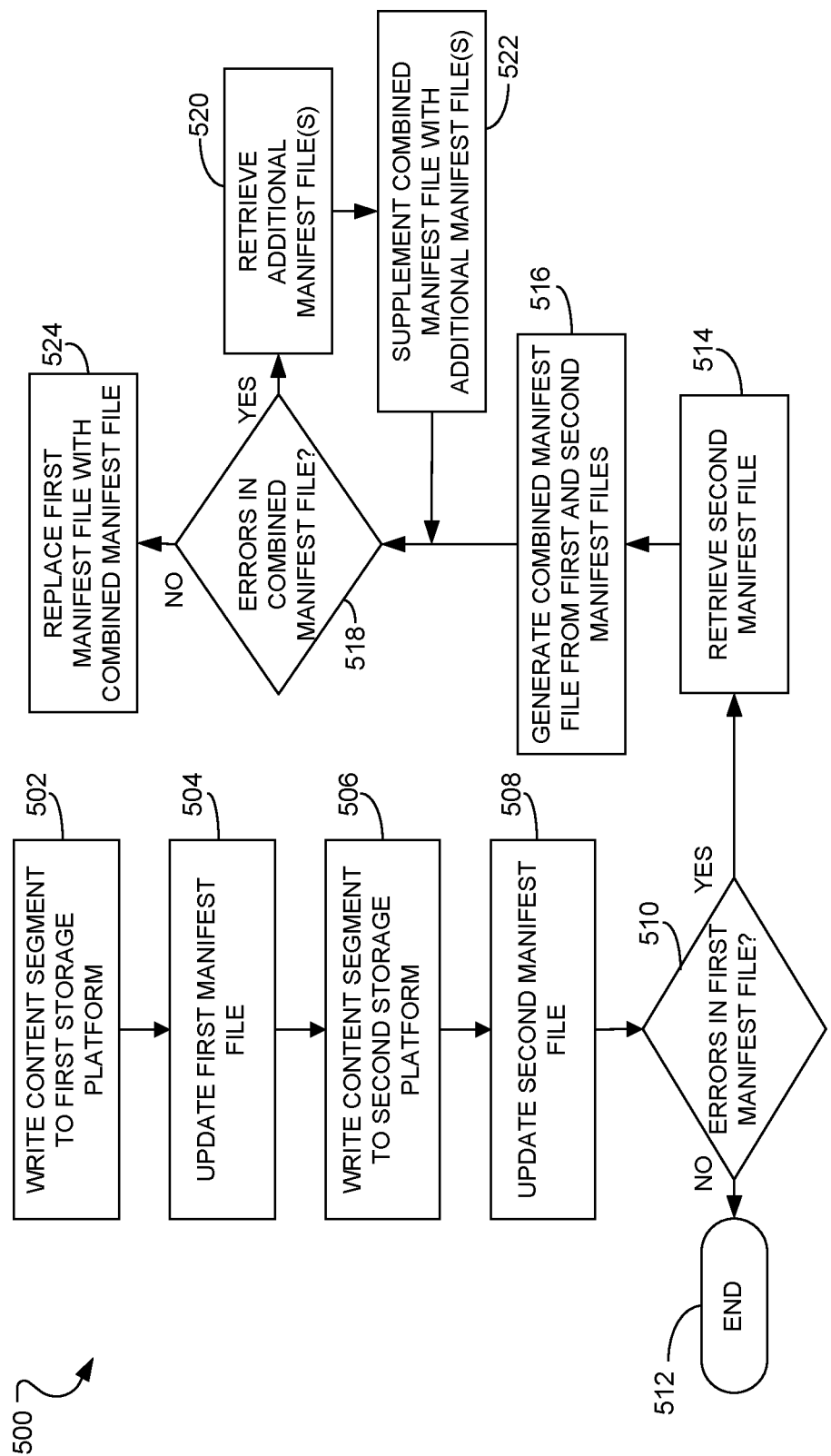
FIG. 5 is a flowchart illustrating a second method, or combination of methods, for resolving errors in manifest files.

FIG. 5 is directed to a second method 500 for resolving errors in manifest files corresponding to transport streams. The method 500 is generally implemented during transport segment write operations. With reference to FIG. 2, for example, the method 500 may be implemented by a content provider computing device 222 configured to generate content and write segments of the content to storage platforms, such as the first and second storage platforms 224, 232.

The method 500 includes writing a first content segment corresponding to a portion of the content to the first storage platform 224 (operation 502). A first manifest file 231 is then updated to include an entry corresponding to the first transport segment (operation 504). The method further includes writing a second content segment corresponding to the same portion of the content to the second storage platform 232 (operation 506) and updating a second manifest file 239 to include an entry corresponding to the second content segment (operation 508). Updating the manifest files 231, 239 may include generating the manifest files 231, 239 or, if the manifest files already exist, supplementing the first manifest files 231, 239 to include an entry corresponding to newly written first transport segments.

A manifest normalizer 250 may analyze the first manifest file 231 to determine whether the first manifest file 231 includes discontinuities or other errors (operation 510). In certain implementations, discontinuities within the first manifest file 231 may be explicitly marked. In such cases, identifying the discontinuities in the first manifest file 231 may include analyzing the first manifest file 231 to determine whether any entries are marked as discontinuities. In other implementations, discontinuities in the first manifest file 231 may be dynamically identified as transport segments are written to the first storage platform 224. For example, in certain cases new transport segments having a predetermined length may be written to the first storage platform 224 at regular intervals corresponding to the predetermined length. In response to writing a transport segment, the first manifest file 231 may be updated with a new entry, with such updates occurring on a similar interval. If an update does not occur within the interval, the system may assume that an error has occurred and that the first manifest file 231 includes a discontinuity for the corresponding entry.

If no errors or discontinuities are present, no additional steps are performed (operation 512). If errors are present, the manifest normalizer 250 may retrieve the second manifest file 239 (operation 514) and generate a combined manifest file by combining the first and second manifest files 231, 239 (operation 516). In certain implementations, the manifest normalizer 250 may then determine whether the combined manifest file includes any other errors or discontinuities (operation 518). If so, an additional manifest file may be retrieved (operation 520) and combined with the current combined manifest file to generate a new combined manifest file (operation 522). In certain implementations, when the combined manifest file no longer includes any errors, the first manifest file 231 of the first storage platform 224 may then be replaced with the final version of the combined manifest file (operation 524).

As provided, the method 500 is directed primarily to identifying and correcting errors, omissions, and discontinuities in the first manifest file 231 using entries and information from the second manifest file 239. In certain implementations, the manifest normalizer 250 may further analyze the second manifest file 239 to determine whether it also includes any errors, omissions, or discontinuities. To the extent such errors can be remedied using location information of the first manifest file 231, the corresponding entries of the second manifest file 239 may be updated or modified to include information from the first manifest file 231. Alternatively, the manifest normalizer 250 may retrieve another manifest file and update or modify the entries of the second manifest file 239 using information contained in the retrieved manifest file to resolve any discontinuities.

Figure 6:
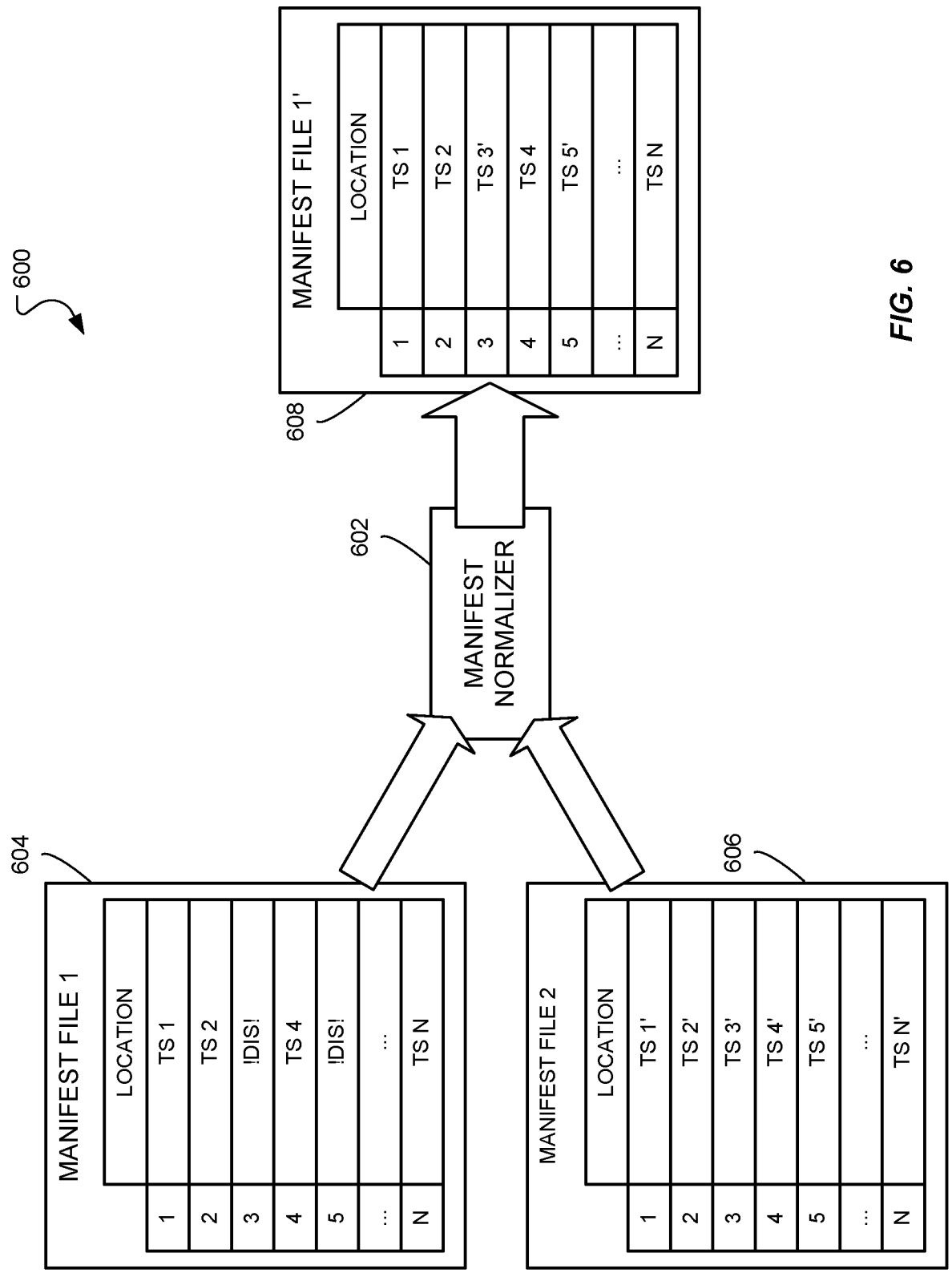
FIG. 6 is a block diagram illustrating the combination of manifest files to generate a combined manifest file.

FIG. 6 is a block diagram 600 illustrating generation of a combined manifest file. More specifically, the block diagram 600 illustrates a manifest normalizer 602 that generates a combined manifest file (MANIFEST FILE 1') 608 from each of a first manifest file (MANIFEST FILE 1) 604 and a second manifest file (MANIFEST FILE 2) 606.

As shown in FIG. 6, the first manifest file 604 includes entries 1-N, each of which includes a location for obtaining each of a first set of transport segments corresponding to a piece of content. In general, each of the entries of the first manifest file 604 includes an index 610 or similar identifier for each transport segment and a location or address. In certain implementations, for example, the location may be an address of the particular transport segment relative to the location of the first manifest file 604. In other implementations, the location may include an absolute location for the particular transport segment, regardless of the location of the first manifest file 604.

As previously discussed, a manifest file is created during or generally at the time of writing of content to a storage platform. In general, the content may be written to the storage platform as a set of discrete transport segments and the manifest file may generally list each transport segment of the content and its location. In certain circumstances, errors or interruptions may occur during the process of writing the content to the storage platform. When such interruptions occur, the corresponding entry or entries of the manifest file may instead be labelled or otherwise identified as discontinuities. Referring to the first manifest file 604, for example, entries are included for each of transport segments TS 1, TS 2, TS 4, and TS N. However, transport segments TS 3 and TS 5 were not successfully written and, as a result, the entries of the first manifest file 604 corresponding to these transport segments were instead labelled by the content provider as discontinuities (!DIS!).

During operation, the manifest normalizer 602 may retrieve the first manifest file 604 in response to, among other things, completion of writing content to a storage platform or a request for content associated with the first manifest file 604. When the first manifest file 604 is retrieved, the manifest normalizer 602 may analyze the first manifest file 604 to determine if it includes any discontinuities. To the extent such discontinuities exist, the manifest normalizer 602 may retrieve one or more second manifest files, such as the second manifest file 606.

Like the first manifest file 604, the second manifest file 606 includes a list of transport segments and their corresponding locations. The second manifest file 606 may include entries corresponding to transport segments for the same content as the first manifest file 604, but stored in a different location, as indicated by locations TS 1'-TS N' listed in the second manifest file 606. Alternatively, the second manifest file 604 may include entries corresponding to transport segments for a different version of the content (e.g., a version of the content having a different bitrate). As shown in FIG. 6, the second manifest file 606 includes complete entries including locations for each of the transport segments for which the first manifest file 604 includes discontinuities. More specifically, the second manifest file 606 include complete entries having locations (i.e., locations TS 3' and TS 5') for the third and fifth transport segments of the content.

In response to receiving the second manifest file 606, the manifest normalizer 602 may generate a combined manifest file 608. In certain implementations, the combined manifest file 608 may essentially be a copy of the first manifest file 604 with any discontinuities filled with information from the second manifest file 606. Accordingly, the combined manifest file 608 may be considered an augmented or supplemented version of the first manifest file 604. As illustrated in FIG. 6, for example, the manifest normalizer 602 generates the combined manifest file 608 by inserting the locations for each of the third and fifth transport segments into a copy of the first manifest file 604. As a result, the combined manifest file 608 includes complete entries for all transport segments of the content.

In certain implementations, after generation of the combined manifest file 608, the manifest normalizer 602 may forward the combined manifest file 608 to a requesting client device. The manifest normalizer 602 may also cause the first manifest file 604 to be replaced with the combined manifest file 608. For example, the manifest normalizer 602 may send the combined manifest file 602 to a storage platform or similar device that includes the first manifest file 604 such that the first manifest file 604 may be replaced with the combined manifest file 608. Accordingly, subsequent requests for the content associated with the first manifest file 604 may result in the combined manifest file 604 being provided instead of the discontinuous first manifest file 604.

Figure 7:
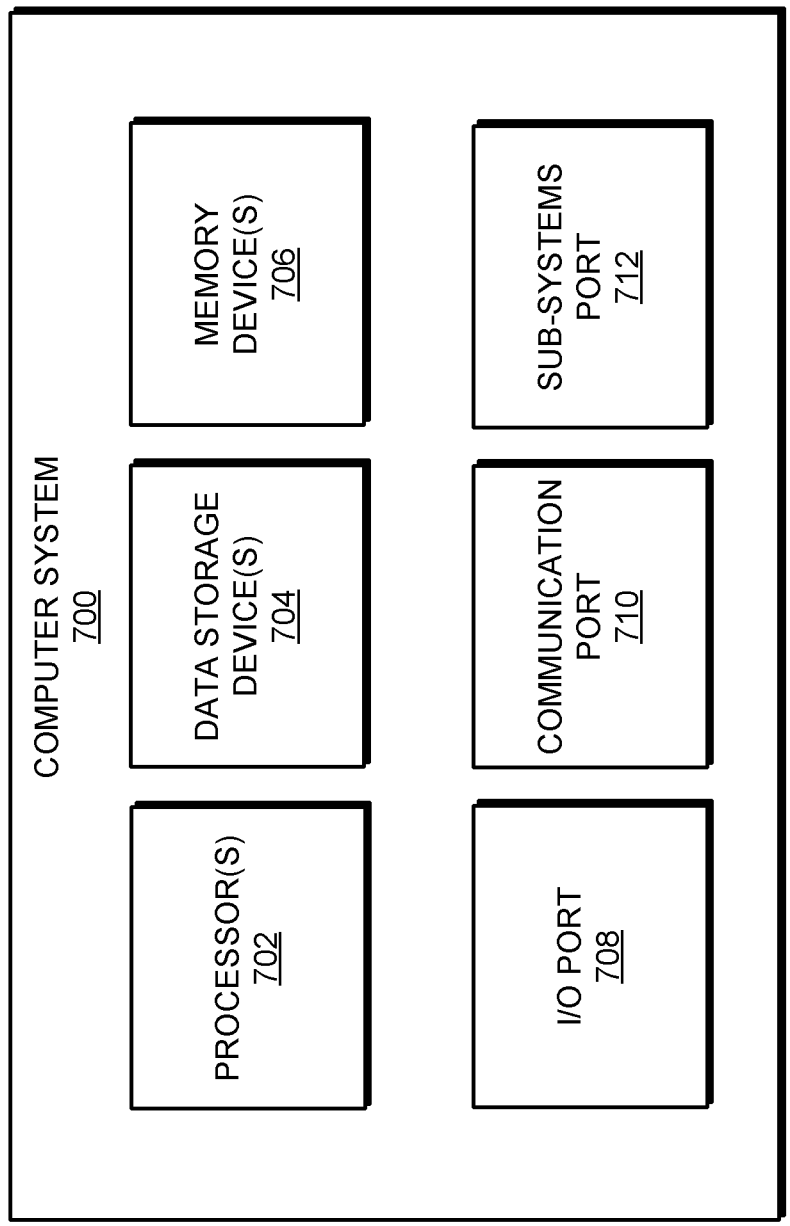
FIG. 7 is an example computing system that may implement various systems and methods of the presently disclosed technology.

Referring to FIG. 7, a schematic illustration of an example computing system 700 having one or more computing units that may implement various systems and methods discussed herein is provided. It will be appreciated that specific implementations of these devices may be of differing possible specific computing architectures not all of which are specifically discussed herein but will be understood by those of ordinary skill in the art.

The computer system 700 may be a computing system capable of executing a computer program product to execute a computer process. Data and program files may be input to computer system 700, which reads the files and executes the programs therein. Some of the elements of the computer system 700 are shown in FIG. 7, including one or more hardware processors 702, one or more data storage devices 704, one or more memory devices 708, and/or one or more ports 708-712. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7.

The processor 702 may include, for example, a central processing unit (CPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on data storage device(s) 704, stored on memory device(s) 706, and/or communicated via one or more of the ports 708-712, thereby transforming the computer system 700 in FIG. 7 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

One or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. Data storage devices 704 may include, without limitation, magnetic disk drives, optical disk drives, solid state drives (SSDs), flash drives, and the like. Data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. One or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708, a communication port 710, and a sub-systems port 712, for communicating with other computing, network, or vehicle devices. It will be appreciated that the ports 708-712 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from the computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example the computing device 700, such as, physical movement of some object (e.g., a mechanical actuator), heating or cooling of a substance, adding a chemical substance, and/or the like.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via communication port 710 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 710 may communicate with an antenna for electromagnetic signal transmission and/or reception.

The computer system 700 may include a sub-systems port 712 for communicating with one or more systems related to a vehicle to control an operation of the vehicle and/or exchange information between the computer system 700 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

We claim:

1. A method of resolving errors in a manifest file, the method comprising:

identifying a first discontinuity in a first manifest file for retrieving content segments of stored content, the first discontinuity identified in an entry of the first manifest file as a discontinuity and corresponding to a first content segment, wherein identifying the first discontinuity occurs without sending the first manifest file to a client device;

identifying an entry of a second manifest file, the entry of the second manifest file including location information for retrieving a second content segment, wherein the second content segment is a copy of the first content segment;

generating a combined manifest file in which the entry of the first manifest file is replaced, at least in part, with the location information of the entry of the second manifest file such that the first discontinuity is resolved using the location information for retrieving the second content segment, and wherein the combined manifest file includes an additional entry of the first manifest file for retrieving a third content segment; and transmitting to the client device the combined manifest file.

2. The method of claim 1, wherein one or more of the first manifest file and the second manifest file are stored in a respective storage platform, the method further comprising retrieving the one or more of the first manifest file and the second manifest file from the respective storage platform.

3. The method of claim 1, wherein one or more of the first manifest file and the second manifest file are cached in a content distribution network (CDN), the method further comprising retrieving the one or more of the first manifest file and the second manifest file from the CDN.

4. The method of claim 1, further comprising receiving a request for the first manifest file from the client device.

5. The method of claim 4, wherein the request for the first manifest file is received by a service adapted to obtain each of the first manifest file and the second manifest file, generate the combined manifest file, and transmit the combined manifest file to the client device.

6. The method of claim 1, wherein identifying the first discontinuity comprises determining the entry of the first manifest file has been marked as including a discontinuity as a result of a failed write operation.

7. The method of claim 1, wherein identifying the first discontinuity comprises determining an update to the first manifest file has not occurred within an update interval, the update interval corresponding to writing of the first content segment to a storage platform.

8. The method of claim 1, wherein the first manifest file is one or more of stored on a storage platform and cached within a content distribution network (CDN), the method further comprising, after generating the combined manifest file, replacing the first manifest file with the combined manifest file.

9. The method of claim 1, wherein the first manifest file includes a second discontinuity, the second discontinuity corresponding to a second entry of the first manifest file and a fourth content segment, the method further comprising:
identifying an entry of a third manifest file, the entry of the third manifest file including location information for retrieving a fifth content segment,
wherein generating the combined manifest file further comprises the second entry of the first manifest file, at least in part, with the location information of the entry of the third manifest file such that the second discontinuity is resolved using the location information for retrieving the fifth content segment.

10. The method of claim 1, wherein the location information is one of a uniform resource locator or an Internet protocol address of the second content segment.

11. The method of claim 1 further comprising:
identifying a second discontinuity in the second manifest file, the second discontinuity corresponding to a second entry of the second manifest file and a fourth content segment;
identifying a second entry of the first manifest file, the second entry of the first manifest file including location information for retrieving a fifth content segment; and
generating a second combined manifest file in which the second entry of the second manifest file is replaced, at least in part, with the location information of the second entry of the first manifest file such that the second discontinuity is resolved using the location information for retrieving the fifth content segment.

12. A system comprising:
a computing device comprising a processor and one or more non-transitory tangible computer-readable storage media storing computer-executable instructions that, when executed by the processor, cause the computing device to:
identify a first discontinuity in a first manifest file for retrieving content segments of stored content, the first discontinuity identified in an entry of the first manifest file as a discontinuity and corresponding to a first content segment, wherein identifying the first discontinuity occurs without sending the first manifest file to a client device;
identify an entry of a second manifest file, the entry of the second manifest file including location information for retrieving a second content segment, wherein the second content segment is a copy of the first content segment;

generate a combined manifest file by replacing the entry of the first manifest file, at least in part, with the location information from the entry of the second manifest file such that the first discontinuity is resolved using the location information for retrieving the second content segment, and wherein the combined manifest file includes an additional entry of the first manifest file for retrieving a third content segment; and
transmit to a client device the combined manifest file.

13. The system of claim 12, wherein the computing device is further configured to receive a request for the first manifest file from the client device and to transmit the combined manifest file to the client device.

14. The system of claim 12, wherein the computing device is one of a content provider computing device or communicatively coupleable to a content provider computing device, the content provider computing device adapted to execute write operations in which the content provider computing device writes content segments to a storage platform.

15. The system of claim 14, wherein the computer-executable instructions further cause the computing device to identify a failure in a write operation by the content provider computing device and to generate the combined manifest file in response to identifying the failure.

16. The system of claim 12, wherein the computing device is a computing device of a content distribution network (CDN) and is communicatively coupleable to the client device.

17. The system of claim 16, wherein the computer-executable instructions further cause the computing device to receive the first manifest file in response to the CDN receiving a request for the first content segment from the client device.

18. The system of claim 17, wherein the computing device receives the request for the first content segment from the client device.

19. A non-transitory computer-readable medium storing instructions that, when executed by one or more processors of a computing device, cause the computing device to:
identify a first discontinuity in a first manifest file for retrieving content segments of stored content, the first discontinuity identified in an entry of the first manifest file as a discontinuity and corresponding to a first content segment, wherein identifying the first discontinuity occurs without sending the first manifest file to a client device;
identify an entry of a second manifest file, the entry of the second manifest file including location information for retrieving a second content segment, wherein the second content segment is a copy of the first content segment;
generate a combined manifest file by replacing the entry of the first manifest file, at least in part, with the location information of the entry of the second manifest file such that the first discontinuity is resolved using the location information for retrieving the second content segment, and wherein the combined manifest file includes an additional entry of the first manifest file for retrieving a third content segment; and
transmit to a client device the combined manifest file.

* * * * *